April 30, 1940.  A. LAUB  2,199,051
PROGRESSIVE INFINITELY VARIABLE CHANGE SPEED GEAR
Filed Oct. 27, 1938  3 Sheets-Sheet 1
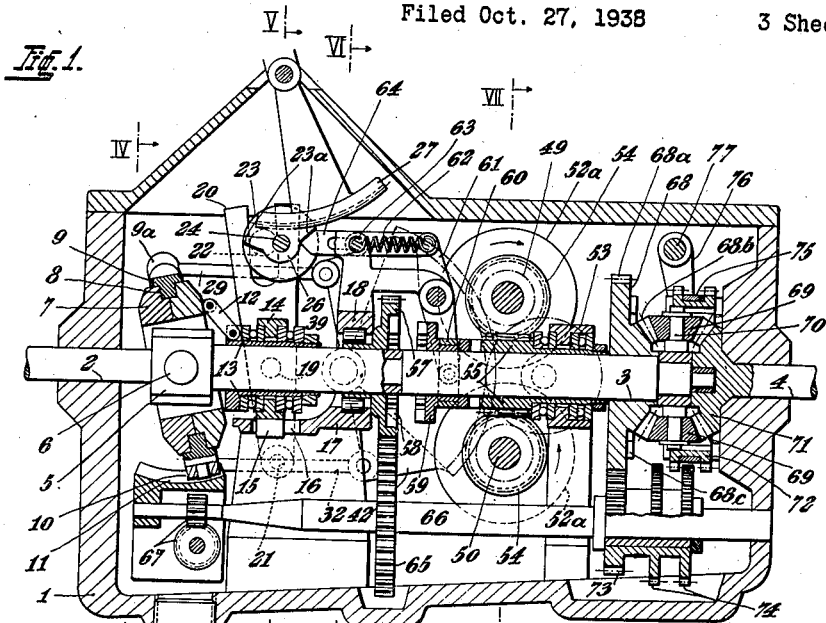
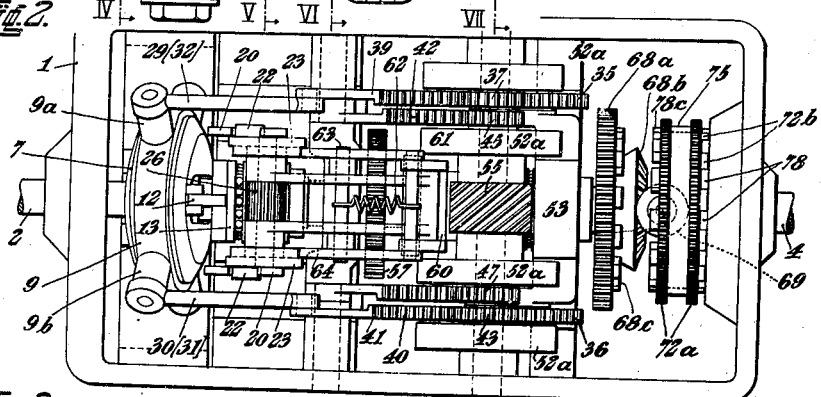
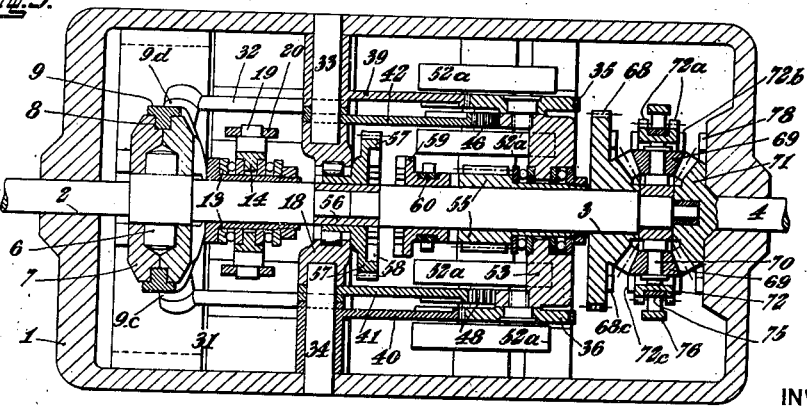
INVENTOR
Adolf Laub
BY
C. F. Wenderoth
ATTORNEY

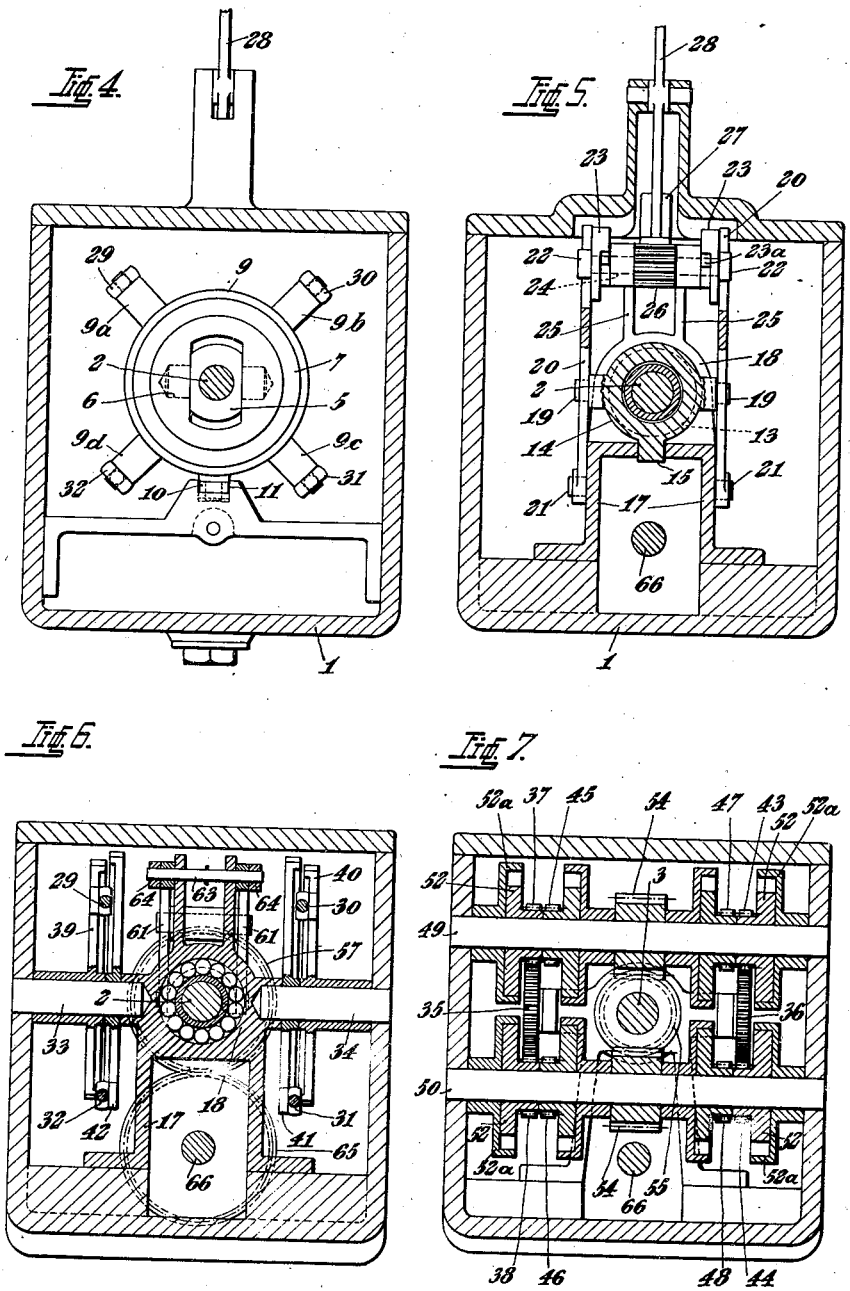

April 30, 1940. A. LAUB 2,199,051
PROGRESSIVE INFINITELY VARIABLE CHANGE SPEED GEAR
Filed Oct. 27, 1938 3 Sheets-Sheet 3
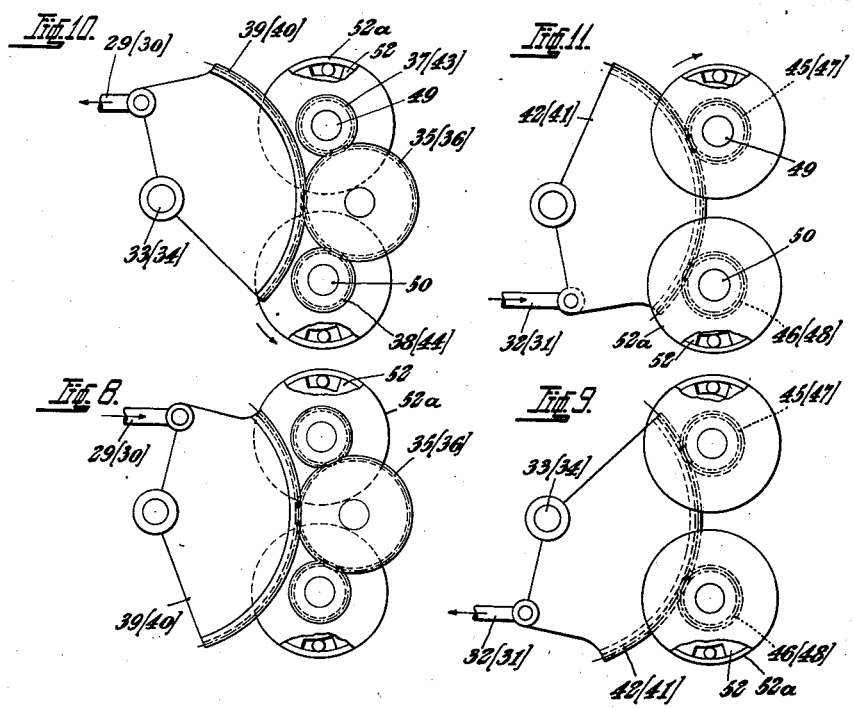
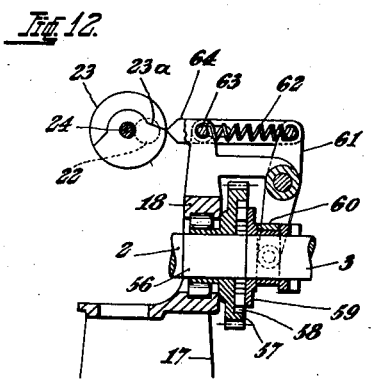
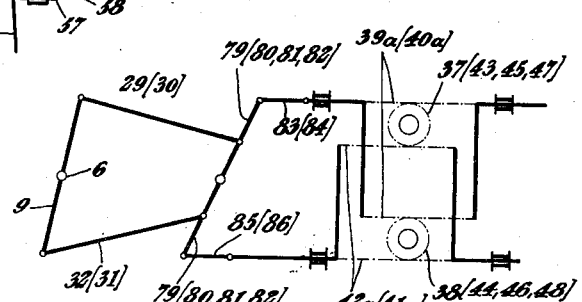
INVENTOR
Adolf Laub
BY
C. F. Wenderoth
ATTORNEY Patented Apr. 30, 1940

2,199,051

UNITED STATES PATENT OFFICE 2,199,051

PROGRESSIVE INFINITELY VARIABLE CHANGE SPEED GEAR

Adolf Laub, Basel, Switzerland, assignor to Comptoir Industriel & Commercial S. A., Glarus, Switzerland, a corporation of Switzerland Application October 27, 1938, Serial No. 237,328
In Switzerland November 2, 1937

8 Claims. (Cl. 74—123)

This invention relates to change speed gears and particularly to a construction for transmitting power at infinitely variable progressive speed ratios by means of a regulating rocking ring, connected by means of connecting rods to control gears actuating the main shaft.

According to known devices of this kind, the two cross shafts of the gear control mechanism are not transmitting power continuously, but only alternately, which does not give silent working of the gears, the reason being that either of the two shafts which at any given moment is not transmitting power, is pulled round by the main gear shaft. This continual change in the direction of the force transmitted, produces in time a certain amount of knocking between the teeth of the gear wheels. According to the present invention this drawback has been eliminated by a construction whereby each connecting rod is connected with two gear control devices, which are arranged on cross shafts driving the main gear shaft and which are acting in such a way that each connecting rod is working in both directions, so that both cross shafts of the gear control device are driving the main gear shaft continuously.

The object of the present invention will now be more particularly described by way of example in the accompanying drawings in which:

Figure 1 is a vertical section through the gear box.

Figure 2 is a horizontal view of the gearing with the gear case cover removed.

Figure 3 is a horizontal section through the centre of the gearing.

Figures 4, 5, 6 and 7 are cross sections according to lines IV—IV, V—V, VI—VI and VII—VII of Fig. 1.

Figures 8 to 11 are diagrams of the gear control device, showing the order of working of the different parts.

Figure 12 is a detail.

Figure 13 shows diagrammatically a variation of part of the gearing.

The driving shaft enters gear case 1 at one end and is marked 2, the main gear shaft is marked 3 and the driven shaft 4. All three shafts are in one line. Driving shaft 2 carries on an enlarged part 5 two pivots 6 at right angles to the shaft, supporting the rocking disc 7, the latter being provided on its circumference with a groove 8, in which the rocking ring 9 is free to revolve. The latter is provided with a guide roller 10 sliding in slot 11, so that the rocking ring cannot revolve with the disc, but is free to oscillate about a horizontal axis at right angle to the shaft, according to the inclination of the rocking disc. The inclination of disc 7 is governed by sleeve 13, sliding on shaft 2, which is connected with the disc by link 12. The sliding sleeve 13 has a groove on its circumference, carrying a ring 14, which is provided with a guide finger 15, sliding in slot 16 of pedestal 17 of bearing 18 supporting the driving shaft at one end. Ring 14 is connected by means of two pivots with two forked levers 20 oscillating round pivots 21 of pedestal 17, the movement of the forks being governed by crank pins 22 of crank discs 23. The crank discs 23 are fixed on a common cross shaft 24, carried by two arms 25 of bearing 18. Between the disc is also fixed on the cross shaft a gear wheel 26, which is in gear with a toothed segment 27, the position of which can be regulated by hand lever 28, according to the desired gear ratio. By moving hand lever 28 from one extreme position to the other, gear wheel 26 and with it shaft 24, are making one half revolution, during which crank pins 22 impart a forward or backward motion to the forked levers 20. Sliding sleeve 13 is thereby moved from one end position to the other and the rocking disc with the rocking ring is oscillated from one maximum inclination to the other. When hand lever 28 is in the central position the rocking disc is in a vertical position and the gear changing device is not working. The rocking ring has four arms at an angle of 90° one from another and at an angle of 45° from the horizontal, marked 9a, 9b, 9c, 9d, each of which is connected to one of the toothed segments 39, 40, 41 and 42, by means of connecting rods 29, 30, 31 and 32. The four segments are mounted in pairs on axles 33 and 34, one pair on each side of bearing 18, the axles being supported by 18 at one end and by the casing wall at the other. The upper arms 9a and 9b, actuating segments 39 and 40 through connecting rods 29 and 30, are connected with them by hinged joints above the level of the axles 33 and 34, whilst the lever arms 9c and 9d are connected with segments 41 and 42 through connecting rods 31 and 32. The toothed segments 39 and 40 are each in gear with an intermediary reversing wheel 35 and 36 respectively, wheel 35 being again in mesh with wheels 37 and 38, and wheel 36 with wheels 43 and 44. Segments 41 and 42 are in gear with wheels 45 and 46, respectively 47 and 48. The four gear wheels 37, 43, 45 and 47 are mounted loose on cross shaft 49 situated above main gear shaft 3, and wheels 38, 44, 46 and 48 are mounted loose on cross shaft 50 situated below shaft 3, the wheels being in pairs on each side of a vertical plane through shaft 3. On one side are wheels 37 and 45 on the upper cross shaft 49 and wheels 38 and 46 on the lower cross shaft 50, whilst on the other side of shaft 3 are situated wheels 43 and 47 on the upper cross shaft 49 and wheels 44 and 48 on the lower cross shaft 50. Each wheel 37, 38, 43, 44, 45, 46, 47 and 48 is fixed rigidly to the inner part 52 of roller locking devices 52, 52a of known construction, the outer part 52a being fixed on cross shafts 49 and 50, respectively. The pockets of the inner part containing the rollers, are arranged in such a way, that the two shafts 49 and 50 are driven in opposite directions, the example showing shaft 49 revolving in a clockwise direction (Fig. 1) whilst shaft 50 is revolving in the opposite direction. The torque of cross shafts 49 and 50 is transmitted through the two wheels 54 and a common gear wheel 55 to gear shaft 3. The gear shaft is supported at one end by ball bearing 53, whilst the other end is revolving in a bush 56 fixed solidly on the end of driving shaft 2. On the outside of the bush is fixed the inner ring of roller bearing 18, the ring again being connected rigidly to a gear wheel 57. This gear wheel 57 is therefore also rigidly connected with driving shaft 2. It is provided on one side with claws 58 as shown in Figures 1 and 3, with which a claw coupling 59, sliding on shaft 3, is brought in gear by an arrangement hereinafter fully described, so that shafts 3 and 2 are directly connected, the engagement taking place when hand lever 28 is being moved to the position of maximum gear ratio. Claw coupling 59 is provided with an annular groove into which fits stirrup 60, which is connected with a double armed lever 61, the latter being controlled by a spring 62, which endeavours to hold claw coupling 59 in the disengaged position. At the upper end of lever 61 are provided two feelers 64, articulating on bolt 63, which are in contact with their bevelled ends (shown on the left in Fig. 1) with cams 23a on crank discs 23. The length of cam 23a, excluding the two bevelled ends, corresponds to 180° of the circumference, so that the engagement of sleeve 59 occurs in the one end position of sleeve 13 controlling the rocking disc.

Gear wheel 57 drives through wheel 65 the shaft 66, at the left end of which in Fig. 1 a worm wheel gearing 67 is provided, which drives an oil pump of known construction, for the lubrication of the gearing. On the side of bearing 53 (in Fig. 1 on its right side), the shaft 3 carries a gear wheel 68 with a toothed crown 68a and a conical gearing 68b. The latter is in gear with two differential pinions 69, carried by pivots 70, which are free to rotate round shaft 3, and are in mesh with bevel wheel 71 fixed on the driven shaft 4. The two pivots 70 and two other arms, forming with them a cross, carry a sliding ring 72 provided with two spur gearings 72a on its circumference and two claw couplings 72b and 72c on its sides. Gear wheel 68a is in mesh with gear wheel 73 on shaft 66, on which it is mounted loose. Wheel 73 is provided with two further spur gears 74, the whole wheel forming the intermediary part of an overdrive gear, which in the middle position of ring 72 is in mesh with the gearings 72a. The position of sliding ring 72 is controlled by ring 75 and two levers 76, mounted on cross shaft 77, the latter being rotated by a hand lever not shown in the drawings. For normal forward speed, i. e. with overdrive out of gear, ring 72 is moved to the left in Fig. 1, in which position claw coupling 72c is in gear with claw coupling 68c of wheel 68. For reverse, ring 72 is put in the other extreme position, in which claw coupling 72b is in mesh with claw coupling 78 on the inside of the gear case cover.

On adjusting the lever 76 in the central position, the gear 72a of the ring 72 is brought into engagement with the wheels 74 and the over drive thereby set in operation.

The working of the described infinitely variable change speed gear is as follows. As long as the rocking disc is in a vertical position to shaft 2, the rocking ring is stationary and does, therefore, not impart any movement to the toothed segments and, therefore, to the shafts 49, 50 and 3. As soon as the rocking disc is inclined, the rocking ring 9 begins to oscillate in a longitudinal direction as described. Diametrically opposite arms of the rocking ring are moving in opposite directions. If, for instance, arm 9a is moving to the right (Fig. 1), arm 9c is moving the same distance to the left. When these two arms have arrived in their extreme positions, the other two arms are in their middle position, arm 9b moving to the right and arm 9d to the left. Through the connecting rods 29, 30, 31 and 32 attached to these arms, the toothed segments 39 to 42 are oscillated forward and backward, therefore, gear wheels 37, 38, 43 to 48 with their inner locking devices are also oscillated to and fro. As the roller pockets of the locking devices 52 driven by the same toothed segment, are arranged in opposite directions, the locking gears are also working in opposite directions of rotation, that is, alternately one after the other, as soon as the direction of rotation of the segment is changed. Owing to the rotation of rocking disc 7, the connecting rods are acting in regular sequence of similar movements. If, for instance, connecting rod 29 has moved to the extreme forward position (to the right in Fig. 8), connecting rod 30 is half-way to the right, connecting rod 31 is in the extreme left or rear position and connecting rod 32 has moved halfway to the rear. Segment 39, driven by connecting rod 29, is acting through gearing 35, 38 on shaft 50 and at the same time segment 41, driven by connecting rod 31, is acting through gear wheel 47 on shaft 49. The other two locking devices are at this movement not transmitting any power. Both shafts 49 and 50 are working simultaneously and with the same power on shaft 3. The transmission ratio of gears 39 (40), 35 (36), 37 (43) or 38 (44) on the one side, and of gears 42 (41), 45 (47), or 46 (48) is naturally the same. In the example shown in the drawing it is 1:2, and 1:5 respectively, so that the two shafts are acting at the same speed on shaft 3. A short distance before connecting rods 29 and 31 have reached their extreme forward positions, connecting rods 30 and 32 are taking their place in transmitting power. After the movement has been reversed segment 39, (40) is rotating the gears 35 (36), 37 (43), 38 (44) in the opposite direction without, for the time being, acting on shafts 49 and 50, as the speed of connecting rods 30 and 32, which are at present acting on these shafts, is still greater than the speed of the connecting rods acting through gears 40, 36, 43 on shaft 49 and through gears 42, 46 on shaft 50. When connecting rods 30 and 32 have reached their extreme forward position, connecting rods 29 and 31 are beginring to transmit power again, but this time through gear wheel 37 on shaft 49 and through gear wheel 46 on shaft 50. The connecting rods are, therefore, working in both directions, that is, in one direction on shaft 49 and in the other direction on shaft 50. As there are two gears working in turns, both shafts 49 and 50 are being driven continuously. Any knocking between the teeth of wheels 54 and 55, due to intermittent working, is avoided and, therefore, also any noise which would result from a change in the direction of the drive.

Another method of construction is shown in Fig. 13. In place of the segments four pairs of racks, 39a (40a), 41a (42a), each pair being combined in a frame, are employed for driving the gear wheels 37, 38, 43 to 48, the gear wheels having in this case all the same diameter. In order to obtain the necessary ratio of transmission, connecting rods 29 (30) and 32 (31) are acting through intermediary levers 79 (80), 81 (82) and rods 83 (84), 85 (86) on the rack frames sliding in special guides. By arranging the direction of working of the locking gears suitably, the same result is obtained for driving the shafts 49 and 50 as in the previous example of construction.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An infinitely variable change speed gear comprising a driving shaft, a rocking ring pivotally mounted on said shaft, means for varying the inclination of said ring in relation to the axis of said shaft, a plurality of one-way drive control gears embodying roller locking devices, a plurality of reciprocating rods connected to said rocking ring, means drivingly associating each of said rods with a pair of said control gears to operate them successively in its opposite directions of reciprocation, cross shafts carrying said control gears, a main gear shaft, gearing drivingly associating said cross shafts with said main gear shaft, whereby said control gears alternately drive said main gear shaft with a continuous motion, a driven shaft, and means drivingly associating said main gear shaft with said driven shaft.

2. An infinitely variable change speed gear comprising a driving shaft, a rocking ring pivotally mounted on said shaft, means for varying the inclination of said ring in relation to the axis of said shaft, a plurality of one-way drive control gears embodying roller locking devices, a plurality of reciprocating rods connected to said rocking ring, a pivotally mounted toothed segment connected to each of said rods and driving a pair of said control gears, to operate them successively in its opposite directions of reciprocation, cross shafts carrying said control gears, a main gear shaft, gearing drivingly associating said cross shafts with said main gear shaft, whereby said control gears alternately drive said main gear shaft with a continuous motion, a driven shaft, and means drivingly associating said main gear shaft with said driven shaft.

3. An infinitely variable change speed gear comprising a driving shaft, a rocking ring pivotally mounted on said shaft, means for varying the inclination of said ring in relation to the axis of said shaft, a plurality of one-way drive control gears embodying roller locking devices, a plurality of reciprocating rods connected to said rocking ring, a pivotally mounted toothed segment connected to each of said rods, and a reverse gear wheel, driving a pair of said control gears, to operate them successively in its opposite directions of reciprocation, cross shafts carrying said control gears, a main gear shaft, gearing drivingly associating said cross shafts with said main gear shaft, whereby said control gears alternately drive said main gear shaft with a continuous motion, a driven shaft, and means drivingly associating said main gear shaft with said driven shaft.

4. An infinitely variable change speed gear comprising a driving shaft, a rocking ring pivotally mounted on said shaft, means for varying the inclination of said ring in relation to the axis of said shaft, a plurality of one-way drive control gears embodying roller locking devices, a plurality of reciprocating rods connected to said rocking ring, means drivingly associating each of said rods with a pair of said control gears to operate them successively in its opposite directions of reciprocation, a main gear shaft, the control gears driven by each reciprocating rod being located on opposite sides of said main gear shaft, cross shafts carrying said control gears, a common gear wheel drivingly associating said cross shafts with said main gear shaft, whereby said control gears alternately drive said main gear shaft with a continuous motion, a driven shaft, and means drivingly associating said main gear shaft with said driven shaft.

5. An infinitely variable change speed gear as set forth in claim 1, including control gear for operating the rocking ring, and a coupling device operated by said control gear, adapted to couple the driving shaft to the main gear shaft automatically when said control gear reaches the position giving maximum gear ratio.

6. An infinitely variable change speed gear as set forth in claim 1, wherein the main gear shaft is coaxial with the driven shaft, and said driving means associating them includes a differential gear, a ring having the ends of the carrier member of said differential associated with its interior periphery for rotation together, but movable in the axial direction of said differential, spur gearing on the periphery of said ring, a pair of claw couplings on the sides of said ring, a pair of gear wheels in fixed association, one of said associated gears being driven by a gear on the main gear shaft, and means for adjusting said ring axially of said differential into a middle position, in which its spur gearing is in mesh with the other of said pair of associated gear wheels to give an overdrive, or into an end position in which one set of said claw couplings is engaged with the gear on the main gear shaft to give a normal forward speed, or into the other end position in which the other set of said claw couplings is engaged with a fixed member to give a reverse drive.

7. An infinitely variable change speed gear comprising a driving shaft, a rocking ring pivotally mounted on said shaft, means for varying the inclination of said ring in relation to the axis of said shaft, a plurality of one-way drive control gears embodying roller locking devices, a plurality of reciprocating rods connected to said rocking ring, a pair of spaced rigidly associated racks connected to each of said rods and driving a pair of control gears, to operate them successively in its opposite directions of reciprocation, cross shafts carrying said control gears, a main gear shaft, gearing drivingly associating said cross shafts with said main gear shaft, whereby said control gears alternately drive said main gear shaft with a continuous motion, a driven shaft, and means drivingly associating said main gear shaft with said driven shaft.

8. An infinitely variable change speed gear comprising a driving shaft, a rocking ring pivotally mounted on said shaft, means for varying the inclination of said ring in relation to the axis of said shaft, a plurality of one-way drive control gears embodying roller locking devices, a plurality of reciprocating rods connected to said rocking ring, a pair of spaced racks rigidly connected together to form an open frame, a rocking lever connected to each of said rods, a link connecting said lever with said frame, driving a pair of said control gears, to operate them successively in its opposite directions of reciprocation, cross shafts carrying said control gears, a main gear shaft, gearing drivingly associating said cross shaft with said main gear shaft, whereby said control gears alternately drive said main shaft gear with a continuous motion, a driven shaft, and means drivingly associating said main gear shaft with said driven shaft.

ADOLF LAUB.